(12) United States Patent
Perry et al.

(10) Patent No.: US 7,366,211 B2
(45) Date of Patent: Apr. 29, 2008

(54) LASER CONTAINING A DISTRIBUTED GAIN MEDIUM

(75) Inventors: Michael D. Perry, Poway, CA (US); Paul S. Banks, San Marcos, CA (US); Jason Zweiback, San Diego, CA (US); Robert W. Schleicher, Carlsbad, CA (US)

(73) Assignee: General Atomics, San Diego, CA (US)

( * ) Notice: Subject to any disclaimer, the term of this patent is extended or adjusted under 35 U.S.C. 154(b) by 37 days.

(21) Appl. No.: 11/470,243

(22) Filed: Sep. 5, 2006

(65) Prior Publication Data

US 2007/0002921 A1   Jan. 4, 2007

Related U.S. Application Data

(63) Continuation of application No. 11/190,357, filed on Jul. 26, 2005, now Pat. No. 7,103,078, and a continuation of application No. 10/302,630, filed on Nov. 21, 2002, now Pat. No. 6,937,629.

(60) Provisional application No. 60/401,411, filed on Aug. 6, 2002, provisional application No. 60/332,085, filed on Nov. 21, 2001.

(51) Int. Cl.
  *H01S 3/04* (2006.01)
(52) U.S. Cl. .......................... 372/35; 372/34
(58) Field of Classification Search ............... 372/108, 372/20, 101, 34, 35, 40, 41, 75
See application file for complete search history.

(56) References Cited

U.S. PATENT DOCUMENTS

| | | |
|---|---|---|
| 3,487,330 A | 12/1969 | Gudmundsen |
| 3,602,836 A | 8/1971 | Young |
| 3,621,456 A | 11/1971 | Young |
| 3,628,179 A | 12/1971 | Cuff |
| 3,631,362 A | 12/1971 | Almasi et al. |
| 3,633,126 A | 1/1972 | Martin |
| 3,675,152 A | 7/1972 | Young |

(Continued)

OTHER PUBLICATIONS

Baer et al., "Performance of Diode-Pumped Nd: YAG and Nd: YLF Lasers in a Tightly Folded Resonator Configuration," IEEE Journal of Quantum Electronics, Apr. 1992, pp. 1131-1138, vol. 28, No. 4 IEEE.

(Continued)

*Primary Examiner*—Minsun Oh Harvey
*Assistant Examiner*—Tuan N. Nguyen
(74) *Attorney, Agent, or Firm*—Fitch, Even, Tabin & Flannery

(57) ABSTRACT

A laser device which may be used as an oscillator or amplifier comprising a chamber having a volume formed therein and a gain medium within the volume. The gain medium comprises a solid-state element containing active laser ion within the volume. A cooling fluid flows about the solid-state element and a semiconductor laser diode provides optical pump radiation into the volume of the laser chamber such that laser emission from the device passes through the gain medium and the fluid. The laser device provides the advantages of a solid-state gain medium laser (e.g., diode-pumping, high power density, etc), but enables operation at higher average power and beam quality than would be achievable from a pure solid-state medium.

25 Claims, 6 Drawing Sheets

U.S. PATENT DOCUMENTS

| | | | |
|---|---|---|---|
| 3,715,682 | A | 2/1973 | Young |
| 3,735,282 | A | 5/1973 | Gans |
| 3,810,041 | A | 5/1974 | Martin |
| 4,134,084 | A | 1/1979 | Dube |
| 4,403,031 | A | 9/1983 | Borrelli et al. |
| 4,528,671 | A | 7/1985 | Robbins |
| 4,555,786 | A | 11/1985 | Byer |
| 4,567,597 | A | 1/1986 | Mandella |
| 4,617,669 | A | 10/1986 | Kuhn |
| 4,703,491 | A | 10/1987 | Lim |
| 4,789,988 | A | 12/1988 | Trost |
| 4,803,439 | A | 2/1989 | Ryan |
| 4,833,682 | A | 5/1989 | Byer |
| 4,876,694 | A | 10/1989 | Hughes |
| 4,908,832 | A | 3/1990 | Baer |
| 4,984,246 | A | 1/1991 | Caberet et al. |
| 5,181,223 | A | 1/1993 | Baer |
| 5,222,092 | A | 6/1993 | Hench et al. |
| 5,311,528 | A | 5/1994 | Fujino |
| 5,329,540 | A | 7/1994 | Lee et al. |
| 5,471,491 | A | 11/1995 | Phillips et al. |
| 5,668,824 | A | 9/1997 | Furumoto et al. |
| 5,757,839 | A | 5/1998 | Biswal et al. |
| 5,774,488 | A | 6/1998 | Kmetec |
| 5,815,523 | A | 9/1998 | Morris |
| 6,034,979 | A * | 3/2000 | Karube et al. .............. 372/39 |
| 6,055,263 | A | 4/2000 | Karube et al. |
| 6,141,367 | A | 10/2000 | Fan et al. |
| 6,304,584 | B1 | 10/2001 | Krupke et al. |
| 6,307,871 | B1 | 10/2001 | Heberle |
| 6,339,605 | B1 | 1/2002 | Vetrovec |
| 6,690,696 | B2 * | 2/2004 | Byren et al. .............. 372/35 |
| 6,747,789 | B2 | 6/2004 | Huonker et al. |
| 6,970,493 | B2 | 11/2005 | Henrie et al. |
| 2003/0198265 | A1 | 10/2003 | Veltrovec |
| 2004/0095974 | A1 * | 5/2004 | Gibson .............. 372/35 |
| 2004/0114657 | A1 | 6/2004 | Veltrovec |

OTHER PUBLICATIONS

Bernard et al., "High-Repetition-Rate Diode-Pumped Nd:YVO$_4$ Slab Laser," Optics Letters, Nov. 15, 1994, pp. 1861-1863, vol. 19, No. 22, Optical Society of America.

Bonch-Bruyevich et al., "Inorganic Liquid Lasers," Optical Technology, Dec. 1973, pp. 770-781, vol. 40, No. 12.

Hamilton et al., "1-W Average Power Levels and Tunability from a Diode-Pumped 2.94-μm Er:YAG Oscillator," Optics Letters, Oct. 15, 1994, pp. 1627-1629, vol. 19, No. 20, Optical Society of America.

Heller, "A High Gain Room Temperature Liquid Laser: Trivalent Neodymium in Selenium Oxychloride," Applied Physics Letters, Aug. 1, 1966, pp. 106-108, vol. 9, No. 3.

Klimek et al., "Dye Laser Studies Using Zig-Zag Optical Cavity," IEEE Journal of Quantum Electronics, Jun. 1994, pp. 1459-1462, vol. 30, No. 6, IEEE.

Lempicki et al., "Characteristics of the Nd+3:SeOCl2 Liquid Laser," Applied Physics Letters, Aug. 1, 1966, pp. 108-110, vol. 9, No. 3.

Mandl et al., "Chirp Control of a Single-Mode, Good Beam Quality, Zigzag Dye Laser," IEEE Journal of Quantum Electronics, Mar. 1997, pp. 303-306, vol. 33, No. 3, IEEE.

Mandl et al., "Cr:LiSAP Thin Slab Zigzag Laser," IEEE Journal of Quantum Electronics, Oct. 1997, pp. 1864-1868, vol. 33, No. 10, IEEE.

Mandl et al., "Energy Scaling and Beam Quality Studies of a Zigzag Solid-State Plastic Dye Laser," IEEE Journal of Quantum Electronics, Oct. 1996, pp. 1723-1726, vol. 32, No. 10, IEEE.

Mandl et al., "Flashlamp-Pumped Cr:LISAF Thin Slab Zigzag Laser," IEEE Journal of Quantum Electronics, Oct. 1998, pp. 1992-1995, vol. 34, No. 10, IEEE.

Mandl et al., "Multipulse Operation of a High Average Power, Good Beam Quality Zig-Zag Dye Laser," IEEE Journal of Quantum Electronics, Mar. 1996, pp. 378-382, vol. 32, No. 3, IEEE.

Mandl et al., "Single-Mode Operation of a Long-Pulse Flashlamp Pumped Dye Laser," IEEE Journal of Quantum Electronics, Feb. 1995, pp. 346-351, vol. 31, No. 2, IEEE.

Shank et al., "Evidence for Diffusion Independent Triplet Quenching in the Rhodamine 6G Ethylene Glycol CW Dye Laser System," Optics Communications, Mar. 1973, pp. 176-177, vol. 7, No. 3.

Sorokin et al., "Flashlamp-Pumped Organic Dye Lasers," Journal of Chemical Physics, May 15, 1968, pp. 4726-4741, vol. 48, No. 10.

* cited by examiner

LASER CONTAINING A DISTRIBUTED GAIN MEDIUM

This application is a continuation of U.S. application Ser. No. 11/190,357, filed Jul. 26, 2005, entitled, LASER CONTAINING A DISTRIBUTED GAIN MEDIUM, now U.S. Pat. No. 7,103,078 which is a continuation of U.S. application Ser. No. 10/302,630, filed Nov. 21, 2002, entitled, LASER CONTAINING A DISTRIBUTED GAIN MEDIUM, now U.S. Pat. No. 6,937,629, which claims the benefit of the following applications: U.S. Provisional Application No. 60/332,085, filed Nov. 21, 2001, entitled LASER CONTAINING A SLURRY; and U.S. Provisional Application No. 60/401,411, filed Aug. 6, 2002, entitled LASER CONTAINING A DISTRIBUTED GAIN MEDIUM, the entire disclosures of all applications incorporated herein by reference.

BACKGROUND OF THE INVENTION

1. Field of the Invention

The present invention relates to the field of laser systems, and more specifically, it relates to laser systems in which the gain medium is diode-pumped.

2. Background

Lasers have been produced from a variety of materials and in all phases: liquid, gas, plasma and solid-state. Liquid lasers most commonly contain of a gain medium of organic dye salts such as derivatives of Rhodamine or fluorescein which are dissolved in solvents such as methanol or water. The gain medium is excited by light produced typically by flashlamps or another laser. These dye lasers exhibit gain across a broad region of the visible to near infrared spectrum. The high gain cross section and broad tunability make these lasers attractive for a number of uses. On the other hand, these dye lasers exhibit a very short upper-state lifetime and low saturation fluence which makes them unsuitable for high energy applications. Furthermore, the absorption bands of these dyes do not overlap with the emission bands of high power semiconductor diode lasers (typically 780 to 980 nm) and are therefore not amenable to pumping with currently available laser diodes.

There have been various attempts at achieving inorganic liquid lasers composed of rare earth salts dissolved in various solvents. The challenge in these systems has been the tendency of the lasing ion (e.g., $Nd^{3+}$) to undergo radiationless decay from the upper laser level in most liquid solutions. This de-excitation is due to the high energy vibrations of bonds involving light atoms such as hydrogen. By eliminating the presence of any light atoms, this quenching can be reduced to the point where lasing can be achieved. For example, this quenching has been used to achieve lasing in Neodymium Selenium Oxychloride.

A significant challenge with such liquid lasers is the corrosive nature of the solvents which requires special handling both the preparation and use of the laser medium. When initially developed, these systems were initially pumped by flashlamps. By using recently developed laser diode arrays as pump sources, the pump light can match the absorption spectrum thereby enabling a resurgence of interest in this type of liquid laser.

Solid-state lasers contain a gain medium which is comprised of a lasing ion contained in a crystal or amorphous matrix. The most common lasing species are based on rare-earth elements such as neodymium, erbium, ytterbium, etc. The laser properties (e.g., absorption and emission cross-section, upper-state lifetime, etc.) of the gain medium are determined by the interaction of the local crystal field with the field of the ion itself. This interaction determines the specific energy levels of the ion and their width. For example, the neodymium ion exhibits a series of narrow absorption lines centered around 808 nm and a series of strong emission lines around 1064 nm when bound in the common crystal matrix, yttrium aluminum garnet (YAG). This laser medium is formed when a small amount of neodymium replaces the yttrium ion in the garnet crystal matrix resulting in neodymium-doped YAG (Nd:YAG). By placing the neodymium in other crystal hosts, very different laser properties can be obtained. For example, neodymium dissolved in phosphate glass will produce a series of broad absorption bands extending from 500 to over 900 nm and tens of nanometers in width. Gain is exhibited across a broad band centered at 1054 nm. Unlike dye lasers, these solid-state lasers exhibit a long upper-state lifetime and a high saturation fluence which enables high energy output. In addition, their absorption bands in the 800 to over 950 nm range make them ideal for excitation by the emission from semiconductor laser diodes based on gallium arsenide (e.g., AlGaAs, InGaAs).

Solid-state lasers are formed by growing the crystal (or melting the glass) and then cutting and polishing the crystal into the desired shape. Large scale, single-pulse systems with the solid-state media in the shape of disks have been developed for laser-driven inertial confinement fusion research with disks over 40 cm in diameter. These systems produce very high pulse energy (approximately 15 kJ) but disadvantageously, have low average power (less than 1 W). High average power systems containing either Nd:YAG or Yb:YAG as the gain medium and pumped by laser diodes have been developed at the kilowatt level. A typical diode-pumped solid-state laser is shown in FIG. 2. The solid state laser 200 includes a laser rod 202 surrounded by a flow tube 204 (sheath) which directs a coolant fluid flow 206 across the laser rod 202 and prevents contact of the laser rod 202 with diode pump sources 208. Pump radiation is produced by the diode arrays 208 which may be coupled into the laser rod 202 by a refracting means 210 (e.g., lenses) or other reflecting means. The coolant fluid removes heat from the laser rod 202 through convection by flowing the fluid 206 over the surface of the laser rod 202. Heat is conducted through the laser rod to the surface. This conduction establishes a large temperature gradient between the center of the rod and the surface. This gradient causes stress within the material which results in beam distortion and eventually catastrophic failure of the crystal. As a result, the average power available from solid-state lasers is limited by the ability to remove heat from the medium.

A class of solid-state lasers which contained the solid material immersed in a fluid were developed in the 1970's and 1980's. These so called "immersion lasers" were flashlamp-pumped and had the solid-state laser material shaped into various forms. For example, as described in U.S. Pat. No. 3,735,282 issued to Gans, a pulsed laser is described which is composed of a segmented Nd:Glass rod immersed in a liquid which is index matched at the emission wavelength. The liquid consists of brominated acyclic hydrocarbon mixed with acyclic alcohol. The segmented rod is immersed in a thermostatically controlled housing surrounded by a helical arc lamp containing xenon or krypton. Gans focuses on a particular type of index matching fluid containing OH and bromine groups to prevent ultraviolet hydrolysis of the index matching fluid.

A similar laser architecture can be found in U.S. Pat. No. 3,602,836 issued to Young, which teaches the use of a segmented laser rod immersed in a coolant fluid. Young focuses on meniscus-shaped segments of zero lens power spaced apart a sufficient distance to permit free passage of sufficient coolant. In U.S. Pat. No. 3,621,456 issued to Young, the use of parallel discs containing reflective surfaces is described. In U.S. Pat. No. 3,487,330, issued to Gudmundsen, a laser arrangement is described in which the flashlamp is enclosed by segmented laser material. In such a system, the coolant flow would be directed inwardly across the segmented laser materials so that the unheated coolant first crosses the laser material and then cools the lamp. Additionally, Gudmundsen also describes that the flashlamp is placed adjacent to the segment laser material. Gudmundsen primarily focuses on various coolant flow geometries for cooling the laser media and the flashlamp.

A packed bed laser composed of solid state glass lasing elements is described in U.S. Pat. No. 4,803,439 issued to Ryan, et al. Ryan et al. teach the use of lasing beads which are packed within a laser cavity to be in contiguous contact with each other. The laser beads are to be of the order of 1 cubic millimeter in volume to facilitate the packing of the glass lasing beads contiguously into the laser amplifier cavity. A cooling fluid is pumped through and in between the lasing beads while the beads are fixed in space. Also, a phase conjugate mirror is required to cancel the optical distortions associated with the lasing medium.

All of these solid-state laser systems including the so-called immersion lasers are limited in average power output by heat removal from the gain media. The difference between the energy of the pump photon and the emission photon is referred to as the quantum defect and left in the crystal as heat. For example, Nd:YAG is pumped by laser diode radiation at 808 nm (photon energy=1.53 eV) and emits laser radiation at 1064 nm (1.17 eV), the quantum defect of 0.36 eV appears as heat within the medium following lasing. This heat must be removed or will terminate lasing by thermally populating the lower laser level (e.g., Yb:YAG) or eventually resulting in catastrophic failure of the laser crystal by thermal stresses associated with the temperature gradient across the crystal. Severe beam distortion and depolarization resulting from the temperature dependence of the refractive index and stress birefringence occur far below the limit of thermal stress induced fracture. Heat is commonly removed by flowing a coolant across the laser material. Alternate heat removal methods designed to address the problem of thermal stress and beam distortion have led to a variety of laser designs, such as thin-disk and zig-zag slab solid state lasers.

What is needed is a laser device in which the advantages of a solid-state gain medium (e.g., diode-pumping, high power density, etc) can be realized but which is not limited in average power output by thermal stress.

SUMMARY OF THE INVENTION

The present invention advantageously addresses the needs above as well as other needs by providing a laser device which addresses the thermal limitations in solid state lasers and provides high average power. Such a laser is generally not limited by thermal stress or other thermal effects in the solid-state gain medium.

In one embodiment, the invention may be characterized as a laser device laser device comprising a laser chamber having a volume formed therein and a gain medium within the volume and comprising a solid-state element containing active laser ion within the volume, the solid-state element rigidly held in a fixed position within the volume. The laser also comprises a fluid flowing about the solid-state element; a semiconductor laser diode for providing optical pump radiation into the volume of the laser chamber; and a laser emission from the solid state element passes through the gain medium and the fluid. A dimension L of the solid state element is defined by:

$$L \le \sqrt{\frac{\Delta T c k_s}{q'''}}$$

where $\Delta T$ is a maximum temperature difference between a center and a surface of the solid state element, $k_s$ is a thermal conductivity of the solid state element, c is a geometric constant wherein c is a value between 4 and 8, and $q'''$ is a heat generated per unit volume within the solid state element resulting from diode-pumping.

In another embodiment, the invention may be characterized as a method of lasing comprising the steps of: providing a laser chamber having a volume formed therein and containing a gain medium, the gain medium comprising a solid state element containing active laser ion within the volume, the solid state element rigidly held in a fixed position within the volume; flowing a cooling fluid through the volume and about the solid state element; directing optical pump radiation produced by semiconductor laser diodes through the chamber into the volume; and directing a laser emission produced by the solid state element through the chamber such that the laser emission passes through the solid state element and the fluid. The providing step comprises providing the laser chamber containing the gain medium, wherein a dimension L of the solid state element is defined by:

$$L \le \sqrt{\frac{\Delta T c k_s}{q'''}}$$

where $\Delta T$ is a maximum temperature difference between a center and a surface of the solid state element $k_s$ is a thermal conductivity of the solid state element, c is a geometric constant wherein c is a value between 4 and 8, and $q'''$ is a heat generated per unit volume within the solid state element.

DETAILED DESCRIPTION OF THE INVENTION

It is an objective of several embodiments of the present invention to provide a diode-pumped, laser in which the average power of the laser is much greater than can be achieved by current solid-state systems which are limited by thermal stress or other thermal effects in the solid-state gain medium.

It is an objective of several embodiments of the present invention to provide a diode-pumped laser which may be operated continuously or pulsed.

It is also an objective of several embodiments of the present invention to provide a laser in which the solid-state gain medium is distributed throughout a flowing coolant and in intimate contact with it.

A laser in accordance with several embodiments of the invention can be used either as the gain medium for a laser oscillator or as an amplifier.

As described previously, there are a multitude of geometries for diode-pumped solid-state lasers. These configurations all utilize a solid-state gain medium which has been configured as a rod, slab, or disk and heat is removed from the gain medium either by conduction to a thermal reservoir or by convection to a coolant flowing over the surface. To our knowledge, there are no configurations of high power, diode-pumped solid-state lasers in which the laser emission axis passes through the coolant. High power operation is considered herein to refer to laser average power in excess of 100 W. In conventional configurations, temperature gradients cause stress within the gain medium resulting in beam distortion and eventually catastrophic failure of the laser if the average power is not limited. It is an objective of several embodiments of the present invention to provide a diode-pumped laser architecture with a large gain aperture which enables both side or end-pumping architectures and achieves high extraction efficiency and higher average power operation than can be achieved from current state-of the art side-pumped or end-pumped laser rods or slabs.

Figure 2:
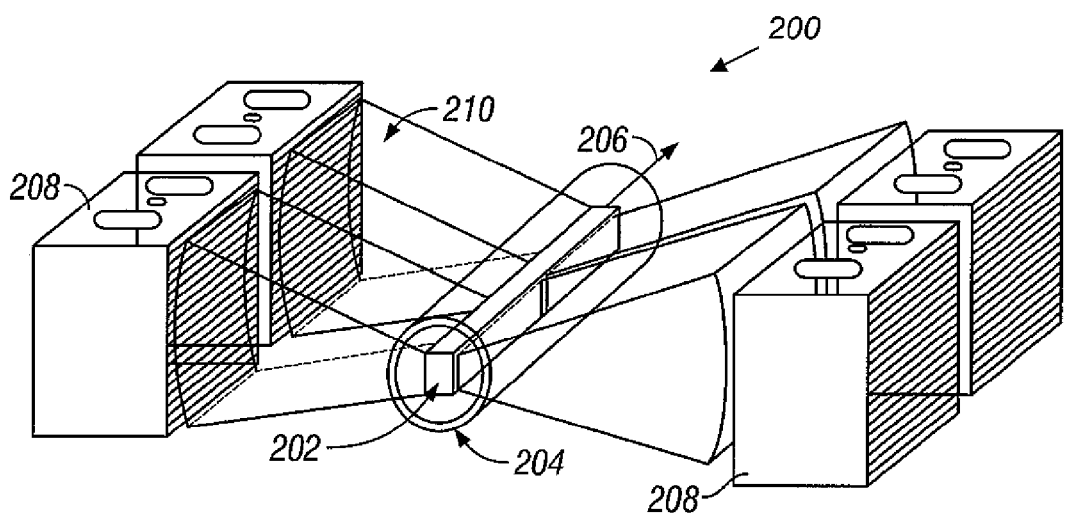
FIG. 2 is a diode-pumped, solid-state laser gain assembly representative of the current art, including a laser rod surrounded by a flow tube which direct coolant flow across the laser rod and prevents contact with a diode pump source. Pump radiation is produced by the diode arrays and may be coupled into the laser rod by refracting (e.g., lenses) or reflecting means.

According to one embodiment, a solid-state laser gain medium comprises a plurality of solid state elements fixed in position within a laser chamber having a volume formed therein. The plurality of solid state elements are immersed in a liquid coolant or fluid which is flowed about the solid state elements. In some embodiments, the fluid is substantially index-matched to the solid state elements, while in other embodiments, the fluid is not required to be substantially index matched. The electromagnetic wave or laser emission passes through the solid state elements and the fluid. This is in contrast to conventional high power solid state lasers, such as illustrated in FIG. 2, where the coolant fluid flows about the solid state gain medium while the laser emission does not pass through the coolant. According to several embodiments of the invention, the gain medium and coolant fluid are homogeneous to the electromagnetic wave and enables the use of a solid-state laser gain medium in which each of the solid state elements have a dimension sufficiently small that heat is rapidly conducted out of the solid-state element into the liquid coolant. Thus, such a laser device provides the advantages of a solid-state gain medium laser (e.g., diode-pumping, high power density, etc), but enables operation at higher average power and beam quality than would be achievable from a pure solid-state medium.

Figure 1:
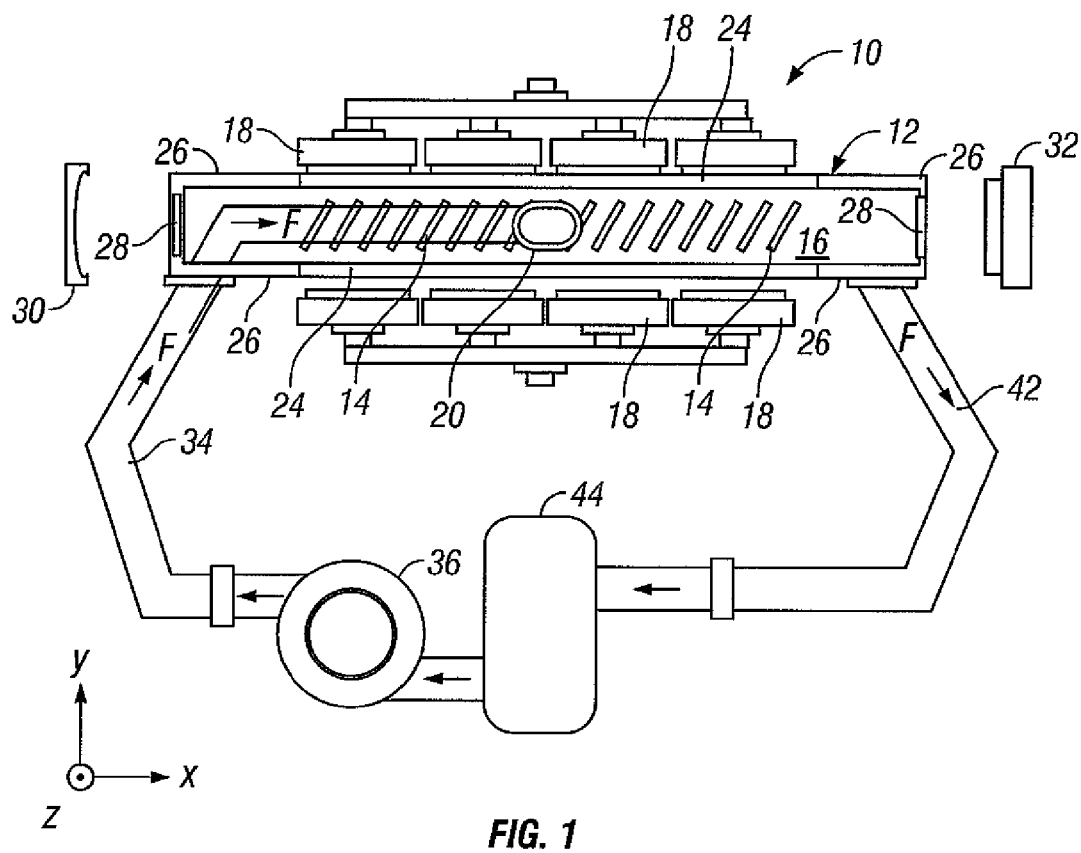
FIG. 1 is a system view of a laser device in accordance with one embodiment of the present invention in which a gain medium comprises rare-earth doped solid-state elements, embodied as flat sheets, fixed in position within a laser chamber and distributed throughout a cooling fluid which exhibits a refractive index similar to that of the solid-state gain material. Flow of the cooling fluid through the laser chamber is across the solid-state elements.

Referring to FIG. 1, one embodiment of a laser device 10 is illustrated. The laser device 10 includes a laser chamber 12 (also referred to as a laser head) having a volume (also referred to as a lasing region) formed therein. A gain medium comprising a plurality of solid-state elements 14 is distributed within the volume. For example, the elements 14 are embodied as flat sheets or plates of solid state material that are distributed or spaced within the volume of the laser chamber 12. According to one embodiment, the elements 14 of solid-state gain medium such as rare-earth (e.g., neodymium) doped glass, yttrium lithium fluoride (Nd:YLF) or other laser host, are distributed inside the volume and a coolant fluid 16 is flowed about the elements 14. The fluid 16 serves as the coolant for the laser medium or elements 14. The elements 14 are thin in one dimension in order to readily conduct the heat out of the solid-state medium into the coolant fluid 16. In some embodiments, the fluid has a refractive index which is approximately index matched to that of the solid state elements 14. As used herein, a fluid is approximately or substantially index matched to the refractive index of the gain medium material when the refractive index is within approximately 20% of the refractive index of the solid state material selected. It is noted that although the elements are primarily described herein as flat sheets or plates, the elements may take on other geometries (e.g., curved, elongated, rounded, etc.) in accordance with several embodiments of the invention.

The fluid 16 generally flows into the laser chamber 12 via an inlet 20 (illustrated on a top surface of the laser chamber 12) and exits the laser chamber 12 via an outlet (not shown in FIG. 1). In this embodiment, the fluid flows vertically from top to bottom across the laser emission axis through the volume (e.g., along the z-axis of FIG. 1). The elements 14 are rigidly held within the volume in a structure (not shown) and the coolant fluid passes in between the elements. For example, the elements 14 are held in position by sleeves or other structures coupled to interior portions of the chamber 12, or are held within grooves formed, for example, in an interior portion of the chamber walls. The elements 14 are preferably sized such that they fill the laser aperture in the large dimension and are sufficiently thin in the small dimension that the temperature gradients within the elements remain far below that imposed by any thermal stress limit in the material. Although discussed in more detail below, the small dimension is preferably less than approximately 1 centimeter and typically in the range of a few microns to a few millimeters, e.g., between 0.01 mm to 10 mm. The elements 14 are excited by pump radiation from arrays of semiconductor laser diodes 18. In the embodiment shown in FIG. 1, diode pump radiation is introduced into the laser chamber 12 through its sides (e.g., along the y-axis).

According to one embodiment, the laser chamber 12 has windows 24 or walls composed of transparent optical material such as fused silica, borosilicate glass or sapphire and also has opaque portions 26 or wall sections. However, it is noted that the chamber 12 may be made entirely of transparent optical material. The chamber 12 may take on a variety of geometries, such as a rectilinear parallelepiped as illustrated, or a cylindrical geometry. For example, the laser chamber 12 includes walls having a thickness and forming the laser chamber with the volume therein. Diode produced pump radiation from the semiconductor laser diodes 18 passes through the windows 24 formed in the side walls of the laser chamber 12. The ends of the laser chamber 12 are composed of optical material transparent to the laser wavelength and form aperture windows 28 for the laser emission to enter and exit the laser chamber 12 along a laser emission axis. Depending on the embodiment, the invention can be used either as a laser oscillator or as an amplifier. The chamber containing the gain medium is placed within a cavity composed of a high reflector 30 and an output coupler 32 (also referred to as a partially transmitting mirror) when the invention is configured as a laser oscillator.

Figure 3:
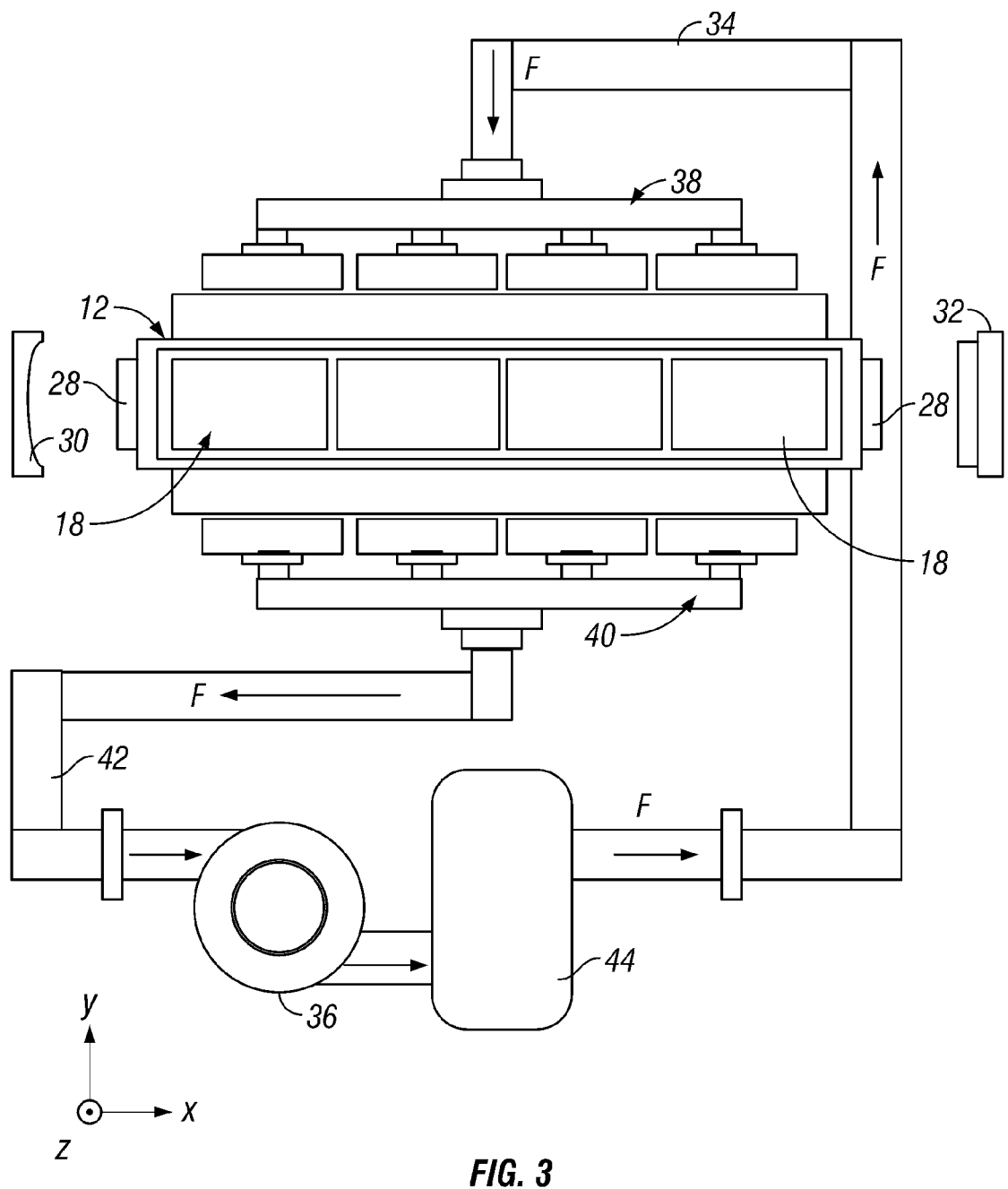
FIG. 3 is an external side system view of an alternative laser device in accordance with another embodiment of the invention in which the coolant fluid is flowed through the laser chamber by a manifold assembly.

Another embodiment of the present invention is shown in the external side system view of FIG. 3, which is similar to the embodiment of FIG. 1; however, the coolant fluid 16 is flowed through the laser chamber 12 using a manifold assembly. For example, an inlet manifold 38 located on top of the laser chamber is coupled to several inlets 20 to the laser chamber 12, while an outlet manifold 40 located on the bottom of the chamber 12 is coupled to several outlets 22 of the laser chamber 12. It is noted that the inlet manifold 38 and the outlet manifold 40 as well as the inlets 20 and the outlets 22 are better illustrated in FIG. 5, which will be described in more detail below. The purpose of the manifold is to distribute the fluid uniformly throughout the laser chamber or head and maintain a uniform flow velocity and pressure. It is noted that FIGS. 4 and 5 better illustrate the laser chamber 12 of the embodiment of FIG. 3.

Figure 5:
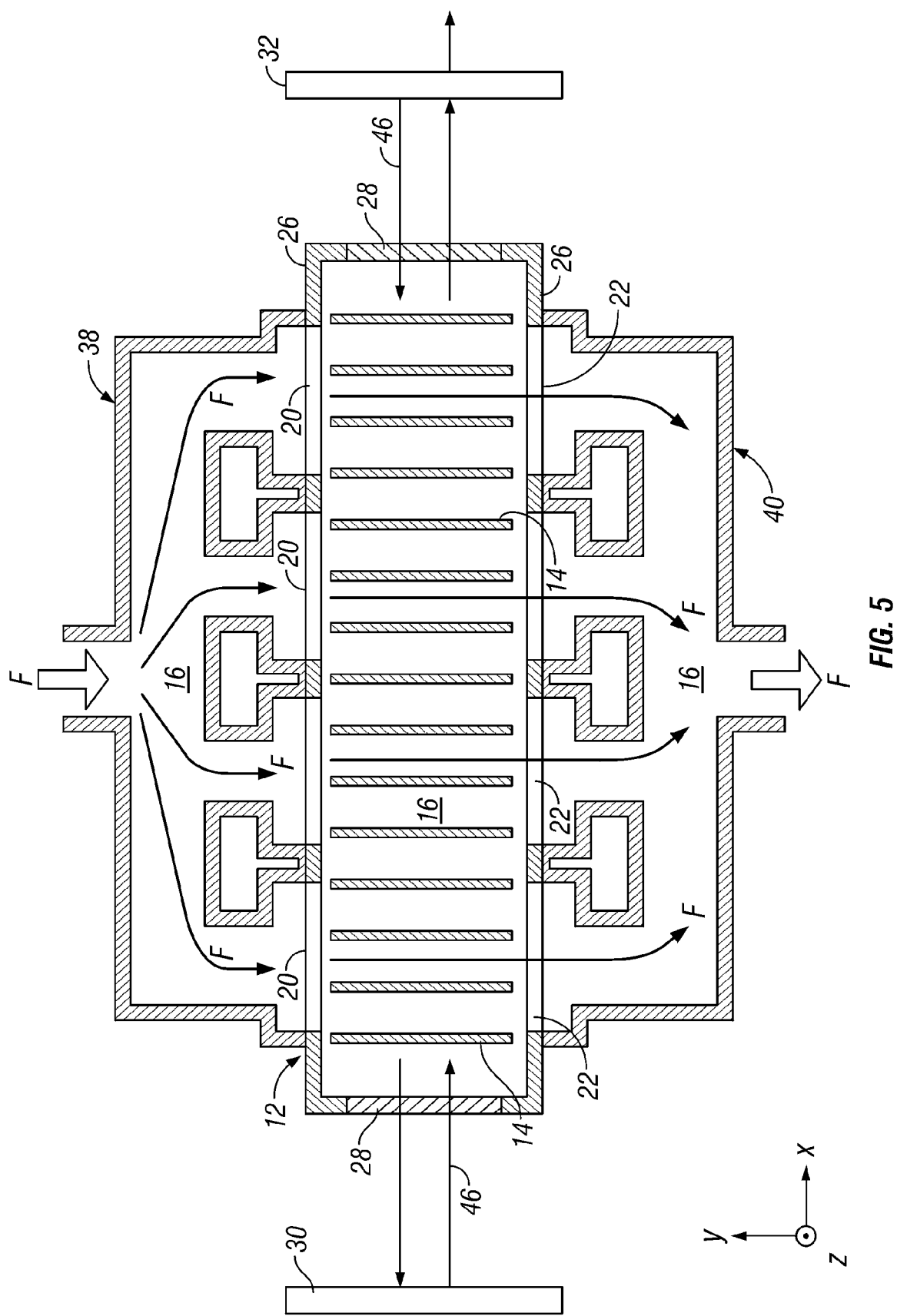
FIG. 5 is a side cross sectional view of the laser device of FIG. 4 taken along line 5-5 of FIG. 4 further illustrating a fluid flow manifold for flowing the fluid through the laser chamber.

Referring to both FIGS. 1 and 3, the coolant fluid 16 is pumped into the volume of the laser chamber 12 through a pipe 34 coupled to the one or more inlets 20 of the chamber 12. For example, in FIG. 1, the pipe 34 is directly coupled to the inlet 20, while in FIG. 3, the pipe is coupled to the inlet manifold 38 which is coupled to multiple inlets 20. A fluid pump 36 is a common centrifugal pump with seals designed for compatibility with the index matching fluid 16. The fluid 16 flows from the pump 36 into the laser chamber 12 via the pipe 34. In this embodiment, the piping 34/inlet manifold 38 are configured to introduce the coolant 16 into the laser chamber 12 at a shallow angle relative to the elements 14 so as not to create large scale turbulent eddies against the solid state elements 14. The minimum flow velocity set by the pump 36 is that required to achieve adequate cooling of the elements 14. As best illustrated in FIG. 5, the coolant fluid 16 flows across the laser emission axis (i.e., the laser emission passes through the fluid 16) and about the elements 14 (e.g., in between adjacent elements 14) and flows out of the laser chamber 12 through one or more outlets 22 coupled directly to a pipe 42 or coupled to an outlet manifold 40 located on the opposite side of the laser chamber 12, which is coupled to the pipe 42. The direction of fluid flow is illustrated by arrows F in FIGS. 1, 3 and 5. Within the laser chamber 12, the elements 14 are excited by optical pump radiation from the arrays of diodes 18. As a result of this excitation, the temperature within the elements increases. This heat is transferred to the flowing coolant fluid 16 by convection at the surface of the individual elements 14. The coolant fluid exiting the laser chamber 12 is directed to a heat exchanger 44 via the piping 42 coupled there between. The heat exchanger 44 cools the fluid 16 back to its starting temperature and then passes the fluid back to the pump 36.

The heat exchanger 44 is most commonly a tube type exchanger where the hot fluid is cooled by conduction through one or a series of tubes, which are, in turn, cooled by a secondary fluid. The secondary cooling fluid is most commonly water or air. Following the heat exchanger, the coolant flows back to the pump 36 completing the flow cycle. It is noted that depending on the embodiment, the fluid may flow through the either of the pump 36 or the heat exchanger 44 prior to flowing the other.

Figure 4:
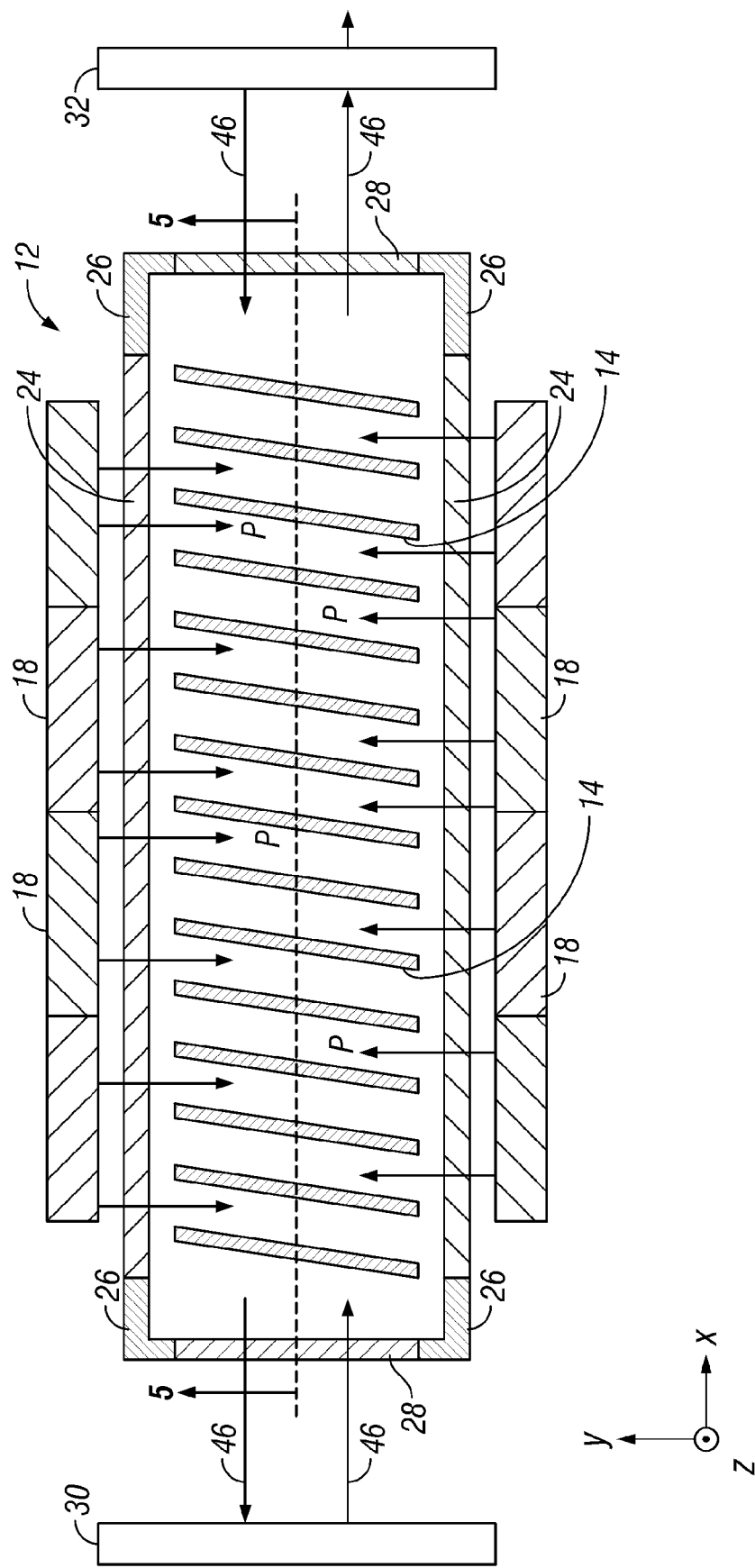
FIG. 4 is an enlarged cross sectional view of the laser chamber of the laser device of FIG. 3 further illustrating the solid-state elements and semiconductor diode pump sources.

It is noted that while referring to the embodiments of FIGS. 1 and 3, concurrent reference will be made to FIGS. 4 and 5. FIG. 4 is an enlarged cross sectional view of the laser chamber of the laser device of FIG. 3 (or of FIG. 1) further illustrating the orientation of the solid-state elements 14 and semiconductor diode pump sources 18. FIG. 5 is a side cross sectional view of the laser device of FIG. 3 taken along line 5-5 of FIG. 4 further illustrating a fluid flow manifold system for flowing the fluid through the laser chamber.

As can be seen in FIG. 4, in another embodiment, the elements 14 are oriented at an angle relative to the path of the laser emission (the laser emission illustrated by arrows 46 in FIGS. 4 and 5), preferably at Brewster's angle. At this orientation, the fluid is not required to be substantially index-matched to that of the solid state elements 14. However, it is noted that such orientation is not required, and the elements 14 may be oriented at any angle (including normal) to the path of the laser emission. FIG. 5 clearly illustrates the top to bottom fluid flow path (arrows F) within the laser chamber 12 and about the solid state elements 14. Preferably, the fluid flows straight through the chamber from the inlets 20 to the outlets 22. It is noted that generally, the elements 14 are oriented parallel to the direction of the fluid flow such that the fluid flows about the entire surface area of the length and width of the elements 14 across the volume. It is further noted that since the view of FIG. 5 is a cross section taken along line 5-5 of FIG. 4, the angular orientation of the elements 14 relative to the laser emission path is not illustrated. However, the elements 14 actually extend diagonally in the y-axis of FIG. 5. Again, in contrast to known solid state lasers as illustrated in FIG. 2, the laser emission from the laser device 10 is intended to pass directly through the coolant fluid 16.

An enlargement of the laser chamber 12 is shown in FIGS. 4 and 5 The laser cavity is formed on one end by a high reflector 30 which is a multilayer dielectric coated mirror designed to be a high reflector at the laser wavelength. In alternate embodiments, this mirror can be comprised of a metallic or semiconductor reflector which may or may not contain a dielectric coating. The gain medium is comprised of the solid-state elements 14 (e.g., plates or sheets) in the cooling fluid 16 which is bounded on both ends of the cavity by the optical window 28 (also referred to as an aperture). In one embodiment, Fresnel losses off of the windows 28 may be minimized by orienting the windows 28 at Brewster's angle relative to the laser emission. At this angle, light which is polarized in the plane of the window 28 passes through with no reflection at the window's surface even when the surface is uncoated. In the preferred embodiment, the window 28 is made of laser grade quality and is made from either fused silica, sapphire or borosilicate glass. At the other end of the cavity is the output coupler 32. The output coupler 32 is a partially reflecting mirror which transmits some of the incident laser radiation. In the preferred embodiment, this mirror is comprised of a multilayer dielectric coating deposited on a fused silica substrate and designed to transmit 10 to 80% of the incident laser radiation. The optimum transmission and geometry of this output coupler 32 will be determined by the single-pass gain within the cavity which is a function of the available pump power from the diodes 18, the concentration of lasing ion (e.g., neodymium) and the length of the gain region and overall cavity design requirements which are well known in the art. The gain medium is excited by pump radiation (illustrated as arrows P in FIG. 4) from arrays of diodes 18 arranged on the side of the gain region. The diode arrays are designed to emit in the absorption band of the solid-state elements 14 (e.g., near 800 nm for neodymium). The pump radiation from the diode arrays passes through a window 24 in the side of the gain region which is formed from either fused silica, borosilicate glass or other optical materials known in the art.

As described above, the gain medium (i.e., the solid state elements 14) and fluid 16 appear nearly homogeneous to the electromagnetic wave since the coolant 16 is in intimate contact with the solid-state elements and in some embodiments, is approximately index matched to it. Laser oscillation occurs between the high reflector 30 and the output coupler 32. The output coupler 32 is a partially transparent mirror which is commonly composed of dielectric layers alternating in refractive index. The high reflector 30 is also well known in the art and is typically a multilayer dielectric coated mirror. Metallic mirrors can also be used. In addition, a deformable mirror can be used in the location of the high reflector. When coupled with a wavefront sensor, such a mirror can be used to compensate for any distortion in the laser head resulting from flow of the fluid or temperature gradients.

As illustrated in FIG. 5, the coolant is flowed transverse to the direction of the laser axis of the laser emission (the emission illustrated as arrows 46 in FIGS. 4 and 5). Radiation from laser diode 18 arrays at a wavelength tuned to the absorption band of the solid-state medium enters through a window 24 on the side of the laser chamber containing the elements 14. In some embodiments, an approximately index-matched coolant is selected such that it exhibits negligible absorption at both the absorption and emission wavelength of the solid-state gain medium (e.g., for Nd:glass $\lambda_a \approx 803$ nm and $\lambda_{em} \approx 1054$ nm). The radiation from the pump diodes 18 is absorbed within the solid-state elements 14 which are held in position within the laser chamber. In the illustrated embodiment, the elements 14 are oriented parallel to each; however, it is not necessary that the elements 14 be oriented parallel to each other. The only requirement is that they are sufficiently separated or oriented from one another that the coolant fluid 16 may pass readily between adjacent elements 14.

In addition to exhibiting negligible absorption, in one embodiment, the fluid 16 is approximately index matched to that of the solid-state medium, i.e., the elements 14, in order that the losses resulting from the difference in refractive index between two different media are sufficiently small to not significantly effect the efficiency of the laser or the net single-pass gain. These losses are due to reflection at the interface and are known in the art as Fresnel losses. There are index matching fluids 16 available within the laser community. While commercially available index matching fluids may be used, simple mixing of miscible fluids: one with an index above that of the gain medium and one below can be used. In one embodiment, the fluids are mixed in the ratio determined by $$n_1 x + n_2 (1-x) = n_p$$

where $n_1$=refractive index of fluid 1
$n_2$=refractive index of fluid 2
$n_p$=refractive index of the solid element
x=mixing fraction An example would be the mixture of carbon tetrachloride and carbon disulfide to provide an index matched fluid for neodymium-doped phosphate glass elements. Carbon disulfide has a refractive index at 1054 nm of 1.62 and carbon tetrachloride has an index of 1.45 while the Nd-doped phosphate glass LHG-5 has a refractive index of 1.531. By mixing carbon disulfide and carbon tetrachloride with 47.65% $CS_2$, an index matched coolant can be obtained. Thus, according to preferred embodiments, carbon-based coolant fluids 16 are used.

For some materials, pure fluids can exhibit a refractive index sufficiently close to that of the solid elements that they may be used directly. A specific example would be the use of carbon tetrachloride (refractive index=1.45) with Nd:YLF (index along ordinary axis=1.4481). The reflection loss (Fresnel loss) at the interface between the coolant fluid 16 and the solid medium (e.g., elements 14) for light which is polarized perpendicular to the plane of incidence is given by, $$R_\perp = \left[ \frac{n_i \cos\theta_i - n_t \cos\theta_t}{n_i \cos\theta_i + n_t \cos\theta_t} \right]^2$$

and, for light which is polarized parallel to the plane of incidence, $$R_{\parallel} = \left[ \frac{n_i \cos\theta_t - n_t \cos\theta_i}{n_i \cos\theta_t + n_t \cos\theta_i} \right]^2$$

where $n_i$ is the index of refraction for the medium in which the light is incident, $n_t$ is the index of refraction of the medium in which the light is transmitted, $\theta_i$ is the angle of incidence and $\theta_t$ is the angle between the normal to the surface and the propagation vector of the light in the transmitted medium. These angles are related by Snell's law, $n_i \sin\theta_i = n_t \sin\theta_t$. For light which is incident normal to the sheet, $\theta_i = \theta_t = 0$, have a loss of much less than one part in 10,000 at the surface for the case of Nd:YLF immersed in carbon tetrachloride. Even if 100 individual elements 14 were implemented within the laser chamber 12, the total Fresnel loss would be less than a few percent for example.

It is noted that a much greater difference can be tolerated in the refractive index between the coolant fluid 16 and the solid state gain elements 14 by simply orienting the elements 14 at an angle with respect to the laser emission axis. The orientation of the elements 14 relative to the laser emission axis is best illustrated in FIGS. 1 and 4. At a specific angle, known as Brewster's angle, the reflection of light polarized parallel to the plane of incidence goes to zero. This angle, $\theta_B$ is given by $\theta_B = \arctan(n_t/n_i)$. Hence, by orienting the elements 14 at Brewster's angle, coolants could be used which exhibit a very large difference in refractive index from the solid-state laser medium.

To complete the design according to several embodiments, the concentration of lasing ion in the solid state elements 14, the number of elements, the aperture size, the element thickness and the spacing between elements 14 should be specified. First, in the side-pumped embodiments shown in FIGS. 1 and 2-5, the concentration of lasing ion should be sufficiently high in the elements 14 to absorb the majority of pump radiation from the diodes 18. We will typically adjust the aperture of the gain region (e.g., adjust the size of the windows 28 and internal volume of the laser chamber 12) such that approximately 90% of the diode light is absorbed by the elements 14. According to one embodiment, this requirement can be written as $\exp[\alpha_a L \sin \phi] \approx 0.08$, where L is the effective absorption coefficient for pump radiation. The angle, $\phi$ is the angle that the element is oriented to pump radiation from the diode arrays. The effective absorption coefficient, $\alpha_a$ is given by $$\alpha_a = N_o \sigma$$

where $N_o$=Concentration of absorbing ions in the element $\sigma_a$=Absorption cross section For example, LG-760 Nd:Phosphate laser glass doped at 5 wt % has a neodymium concentration of $4.65 \times 10^{20}$ ions/cm$^3$ and an effective absorption cross section over the 803 nm band of $2.4 \times 10^{-20}$ cm$^2$, leading to an absorption coefficient of 11 cm$^{-1}$.

Figure 6:
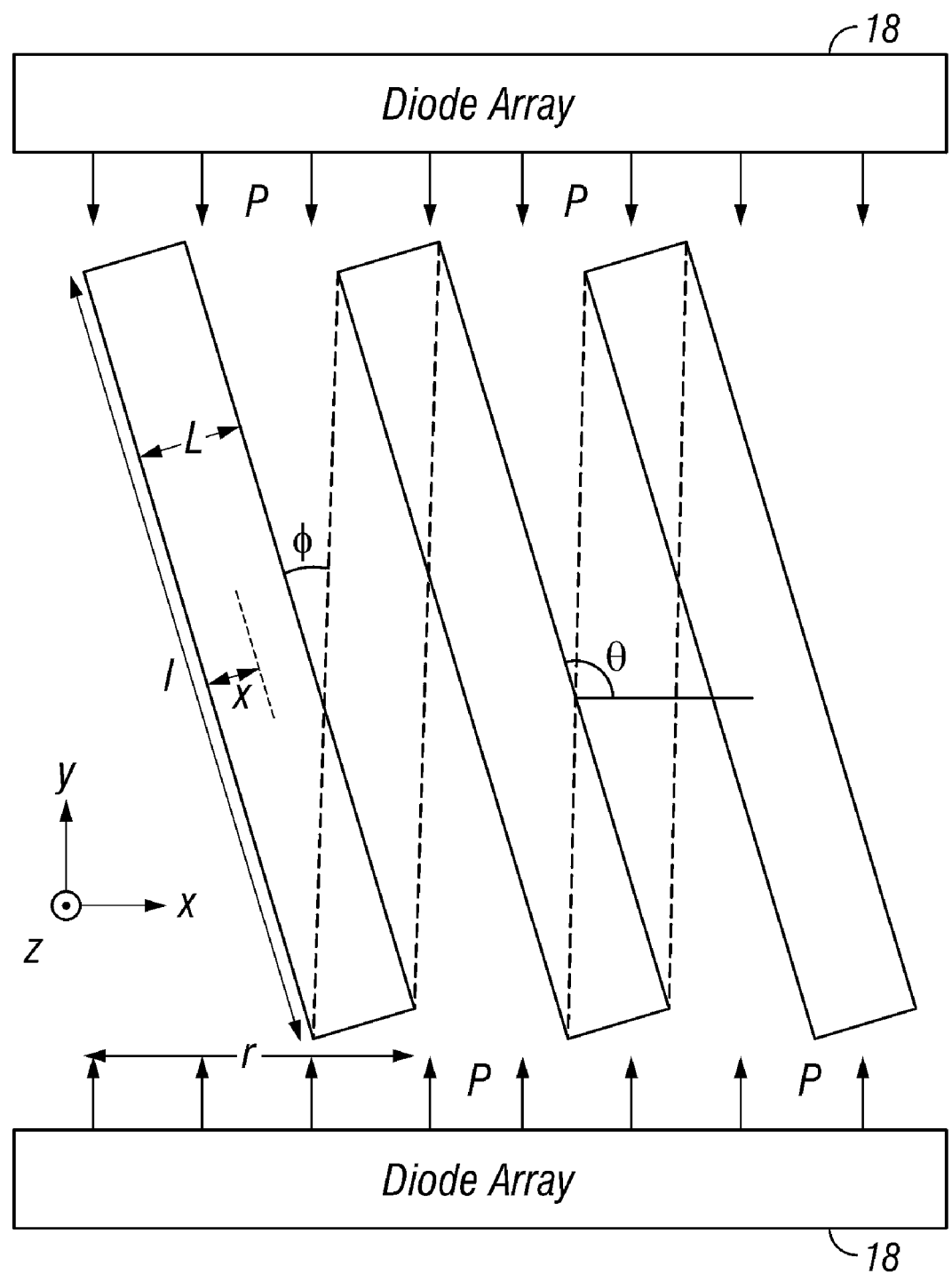
FIG. 6 is a diagram illustrating the orientation of solid state elements embodied as sheets in accordance with an embodiment of the invention.

The spacing of the elements 14 is adjustable. In preferred embodiments, such as best illustrated in the enlarged diagram of FIG. 6, the elements 14 are located such that the elements 14 overlap each other once when viewed from the perspective of the incident pump radiation P. This embodiment allows for the most uniform pumping of the elements 14, allowing for high extraction efficiency in the laser system and low stress in the material. It is noted that the amount of overlap of elements 14 may be adjusted depending on the specific implementation. However, if that is the case the overlapped distance should be r/m when r is the vertical projection of the entire elements and m is an integer. This ensures that the pump light will always see the same absorption length all along the gain length. Other spacing between elements 14 could be used with associated losses and higher stresses in the material. It is noted that although in preferred embodiments, the elements are made to overlap each other from the perspective of the incident pump radiation, in other embodiments, the elements 14 may not overlap each other at all. Also illustrated in FIG. 5, the elements 14 are oriented at an angle $\theta$ relative to the laser emission axis (preferably, Brewster's angle) and oriented at angle $\phi$ relative to the incident diode pump radiation, the elements having a length l and a thickness L. As described above, the thickness L should be carefully designed in order to allow effective heat removal from the element 14 during the lasing action.

The effective small-signal gain coefficient along the laser emission axis, $\alpha_e L$, is given by, $$\alpha_e L = N \sigma_e (N_{sheets} L / \cos \phi)$$

where $\sigma_e$ is the emission cross section, N is the concentration of ions within the solid state element 14 which have been excited by the pump radiation, $N_{sheets}$ is the number of elements 14 within the laser chamber which have been pumped by diode radiation and $L/\cos \phi$ is the projection of an element of thickness, L, along the laser emission axis. The ion concentration which is excited is approximately, $N = \alpha_a \phi_p(x,y,z) \tau_P$ where $\phi_p(x,y,z)$ is the local photon flux from the pump diodes at the point (x,y,z) within the laser chamber 12 and $\tau_p$ is the duration of the pump light. This approximation of $N = \alpha_a \phi_p(x,y,z) \tau_p$ is applicable for pulsed diode pumping and neglects any spontaneous or stimulated emission during the pump duration. The excited ion density is more difficult to calculate in the case of continuous pumping due to the necessity to account for spontaneous emission.

Current diode bars (e.g., semiconductor diodes 18) are able to produce up to 80 W continuous output power from a 1 cm length. For a 2 cm wide by 20 cm long gain region, current state of the art diode pump arrays could produce a pump power in the range 15-20 kilowatts. TABLES 1 and 2 shows the expected gain for neodymium-doped glass and Nd:YLF elements 14 spaced to just overlap each other for a total length of the laser chamber of 10 and 20 cm, respectively as a function of continuous diode pumping (per bar output power). The gain is much higher for YLF due to both a longer upper-state lifetime and a larger stimulated emission cross section.

TABLE 1

Calculated gain for Nd-doped phosphate glass system

| | Power per Bar | | |
|---|---|---|---|
| | 60 W | 70 W | 80 W |
| Average population inversion | 1.01e18 | 1.18e18 | 1.35e18 |
| Single pass gain (10 cm) | 1.08 | 1.10 | 1.12 |
| 4 pass gain (10 cm) | 1.36 | 1.46 | 1.57 |
| Single pass gain (20 cm) | 1.18 | 1.21 | 1.25 |
| 4 pass gain (20 cm) | 1.94 | 2.14 | 2.44 |

TABLE 2

Calculated gain for the Nd; YLF system

| | Power per Bar | | |
|---|---|---|---|
| | 60 W | 70 W | 80 W |
| Average population inversion | 1.38e18 | 1.61e18 | 1.81e18 |
| Single pass gain (10 cm) | 1.65 | 1.79 | 1.95 |
| Single pass gain (20 cm) | 2.73 | 3.23 | 3.82 |

In the embodiment illustrated in FIGS. 1 and 3-5 and Tables 1 and 2, the laser chamber 12 was pumped from two sides at 400 W/cm$^2$. Since the width and length of the laser chamber 12 are set by absorption and gain, respectively, the only variable dimension in this embodiment is the height. In principle, any height could be used when pumping from the two sides. However, diffraction of the beam is minimized when the aspect ratio of the aperture (volume) is approximately 1:1. Hence, in preferred embodiments, good laser performance with minimal divergence would be obtained when the height is approximately equal to the width. For our present example, the height would therefore be approximately 2 cm. The total diode power would then be approximately 16 kW from each side. Current state of the art diode arrays contain 1 cm long bars placed on a 1.7 mm pitch. With 2 mm between the bars, we would have two blocks of diode arrays, each of which is 12 bars high and 17 bars long on each side of the laser chamber. The total number of bars on each side is then 204. To achieve 16 kW pump, will require each bar to operate at approximately 80 W for the duration of the pump pulse.

TABLE 3 below illustrates several different possible materials for the gain medium and their properties. In addition to the laser materials shown in TABLE 3, we have also evaluated the performance of erbium and ytterbium-doped laser materials for use in several embodiments of the current invention. The design concepts described previously would enable anyone of ordinary skill in the art to produce a laser utilizing thin solid-state laser elements distributed in a coolant as the gain medium.

TABLE 3

Material characteristics

| | Nd: YAG | Nd: YLF σ | Nd: YLF π | Nd: Glass - LG-760 |
|---|---|---|---|---|
| Nd density (at 1 at. %) | $1.38 \times 10^{20}$ cm$^{-3}$ | 1.38 × 10$^{20}$ | | $0.93 \times 10^{20}$ |
| Upper state lifetime | 230 μs | 520 μs | | 360 μs |
| Lower state lifetime | <200 ps | 10 ns | | |
| Thermal cond. (W/cm-K) | .14 | .06 | | .006 |
| Laser wavelength (nm) | 1064.1 | 1053 | 1047 | 1053.5 |
| Index of refraction | 1.82 | 1.4481 | 1.4704 | 1.508 |
| Emission cross section | $2.8 \times 10^{-19}$ cm$^2$ | $1.2 \times 10^{-19}$ | $1.8 \times 10^{-19}$ | $4.2 \times 10^{-20}$ cm$^2$ |
| Absorp cross section | $2.9 \times 10^{-20}$ cm2 | $2.2 \times 10^{-20}$ | $6.5 \times 10^{-20}$ | $2.4 \times 10^{-20}$ |
| Absorption peak | 808 nm | 797 nm | 792 nm | 808 nm |
| Absorp. coef (1 at. %) | 4 cm$^{-1}$ | 3 cm$^{-1}$ | 9 cm$^{-1}$ | 2.2 cm$^{-1}$ |

Several embodiments of the current invention are specifically designed to address the need for efficient, high average power laser operation at apertures greater than approximately one square centimeter. Efficient operation is achieved in continuous wave lasers by operating the laser near the saturation intensity, $I_{sat}=h\nu/\sigma_e\tau$. For the case of the materials described in TABLE 3, this ranges from 2.9 (Nd:YAG) to over 12 kW/cm$^2$ (Nd:Glass). Thus, according to one embodiment of the invention, a laser device is provided which has an aperture greater than 1 cm$^2$ and an average power of at least 1 kW/cm$^2$, although it is understood that laser devices may be made in accordance with the invention that have considerably less output power. No conventional solid-state laser could operate at this level of average pump power and size. Laser operation in such conventional solid state lasers would cease rapidly as the temperature increased in the absence of cooling. The laser material would have to be cooled by a fluid flowing over its surface. All known solid-state laser materials would fracture due to thermal stress or severely distort the beam resulting from the large temperature gradient which would be established between the center region of the laser and the cooled surface at an aperture greater than approximately 1 cm and pumped by this level of average diode power. The present invention solves this problem by having one dimension of the solid-state laser elements sufficiently small that the temperature gradient established between the center of the element and the surface is small. Furthermore, the temperature of the gain medium elements is readily controlled by simply controlling the temperature of the fluid by conventional heat exchanger technology which is well known in the art. These features are quantified by calculating the temperature distribution inside a thin sheet element. In the limit that the thickness of the element 14 is much smaller than either its width or height, we can approximate the temperature distribution across the element as being described by one-dimensional heat flow, $$\frac{\partial^2 T}{\partial x^2} + \frac{q'''}{k_s} = 0$$

where $k_s$ is the thermal conductivity of the solid laser medium, x is the distance measured from the center of the element 14 toward its surface in the thin dimension of the element (see FIG. 6), and q''' is the local heat generation within the volume. Heat is conducted throughout the element 14 and is transferred to the fluid by convection at the surface. This is described by the surface boundary condition, $$-k_s \frac{\partial T}{\partial x} = h(T_s - T_f)$$

where h is the surface heat transfer coefficient, $T_s$ represents the temperature of the element 14 at its surface and $T_f$ represents the temperature of the fluid 16 far away from the element surface. These equations can be readily solved to show that the steady-state temperature distribution across the thin dimension of the element 14 is parabolic with a maximum temperature difference between the center of the element 14 and its surface ΔT of, $$\Delta T = \frac{q''' L^2}{c k_s}$$

where c is a geometric constant depending on the geometry of the element 14. For example, c can be a number roughly between 4 and 8, e.g., c≅8 for a sheet or plate element. Thus, in a sheet element, ΔT is provided by:

$$\Delta T = \frac{q''' L^2}{8 k_s}$$

In the limit of low fractional excitation of the active laser ions in the solid-state medium (i.e., non-saturated excitation), volumetric heat generation, q'''(W/cm$^3$) occurs throughout the element 14 at a rate given by, q'''=$I_{pump}\alpha_a\delta$ where $I_{pump}$ is the irradiance of the diode pump radiation, $\alpha_a$ is the absorption coefficient described earlier and δ is known as the quantum defect. The quantum defect is the difference in energy between the absorption and emission bands of the laser medium. For Neodymium, photons absorbed near 803 nm have an energy of 1.54 eV and the emission near 1060 nm have an energy of 1.17 eV, quantum defect, δ≈(1.54 eV-1.17 eV)/1.54 eV =24%. In other words for every photon absorbed from the pump, at least 0.37 eV is left in the solid-state material as heat. For a pump flux of $I_{pump}$=400 W/cm$^2$ and an absorption coefficient of 9 cm$^{-1}$, we will have heat generated inside the element 14 at a rate of q'''=864 W/cm$^3$. When the fraction of ions excited is large, a more appropriate estimate of the volumetric heat generation rate is, $$q''' = N_{ex} \delta E_{pump}/\tau$$

where $N_{ex}$ is the upper state excited ion density, $E_{pump}$ is the energy of absorbed pump photons and $\tau$ is the lifetime of the upper laser level in the solid-state material.

According to several embodiments of the invention, the elements 14 are designed to have at least one dimension that is significantly less than the other dimensions to allow heat removal from the element 14 through conduction to the surface and then convection to a flowing fluid 16. For example, sheet shaped elements should be designed sufficiently thin to allow the generated heat to be removed at a rate such that the maximum temperature reached within the solid and the gradient remain sufficiently low to enable efficient lasing and good beam quality. It is noted that the dimension designed to be sufficiently small may be a thickness of a sheet or a diameter of a cylinder, for example. Solving the above equations for L, which is the small dimension of the element (e.g., thickness illustrated in FIG. 6), the maximum thickness of the element 14 in order to ensure adequate heat removal is given by:

$$L \le \sqrt{\frac{\Delta T c k_s}{q'''}}$$

This equation enables one of ordinary skill in the art to design a laser oscillator or amplifier based on the present invention simply by knowing the basic thermo-optical properties of the solid-state laser material (e.g., thermal conductivity, $k_s$, absorption cross section, $\sigma_a$, ion density, N, and the quantum defect, $\delta$) and the irradiance of the diode arrays $I_{pump}$. As described previously, it is the pump irradiance, the absorption of the material, and the quantum defect which determine the volumetric heat generation rate, q''' in the material. The maximum allowable $\Delta T$ will vary for different laser materials but is typically less than 100° C.

In general terms in order to achieve high power laser operation, e.g., power above 100 W, the difference in temperature between a center of an element 14 and its surface, ($\Delta T$ in the equations above) should be less than approximately 100° C. for most solid-state laser materials. Thus, solving the equation for $\Delta T$ above provides a maximum quantity to the small dimension of the element 14 such that the element 14 will be sufficiently thin for heat removal. For example, in the case of a sheet-like element 14, for a maximum temperature difference $\Delta T$ of 100° C., the thickness of the element 14 in order to ensure adequate heat removal is given by:

$$L \le \sqrt{\frac{800 k_s}{q'''}}$$

The significance of the several embodiments of the present invention lies in the dependency of the temperature on the square of the dimension of the solid-state laser media, e.g., elements 14. As a specific example, consider the use of Nd:YLF as the solid-state laser material. The thermal conductivity of Nd:YLF is $k_s$=6.0 W/m ° C. From the above equations, we see that the temperature difference between the center of the element and its surface, $\Delta T = T(0) - T_s = q''' L^2 / 8k_s$ is less than 20° C. for a one millimeter thick element 14 pumped at 400 W/cm$^3$ and an absorption coefficient of 9 cm$^{-1}$. Note that a conventional rod with a diameter of the order of 1 cm pumped under the same conditions would exhibit a characteristic thermal difference between the center and the edge of several thousand degrees with catastrophic failure occurring much earlier. Furthermore, since heat is conducted out of the elements predominantly along the direction of the laser axis, the effect of the temperature gradient on the wavefront quality of the laser beam is much less than in conventional rod or slab based systems in which the heat is conducted transverse to the laser axis.

As such, according to several embodiments, a laser device is provided that can be configured to operate at high average power and exhibits a maximum temperature much less than is achievable in current state of the art diode-pumped, solid-state lasers. This is due in part to the relative sizing of the solid state elements 14 as distributed throughout the laser chamber 12 and cooling fluid 16 flowing about the elements 14 such that the laser emission passes through the elements 14 and the fluid 16. In some embodiments, the fluid is substantially index matched to the elements 14 at the relevant laser emission wavelength and the relevant optical pump source wavelength; thus, the majority of the pump radiation is absorbed by the solid state elements 14. Since the laser device is generally not limited by temperature rise in the solid state material, the laser device may be operated in a pulsed manner or in a more continuous manner. For example, a laser device in accordance with several embodiments of the invention may be operated continuously for very long periods of time, such as, greater than 1 second to fully continuous. That is, the optical pump radiation from the semiconductor diode array is continuously pumped into the gain medium for a duration of at least the time desired for laser output. This output time is limited only by the ability to supply pump power to the gain medium and remove heat from the fluid in the heat exchanger.

Figure 7:
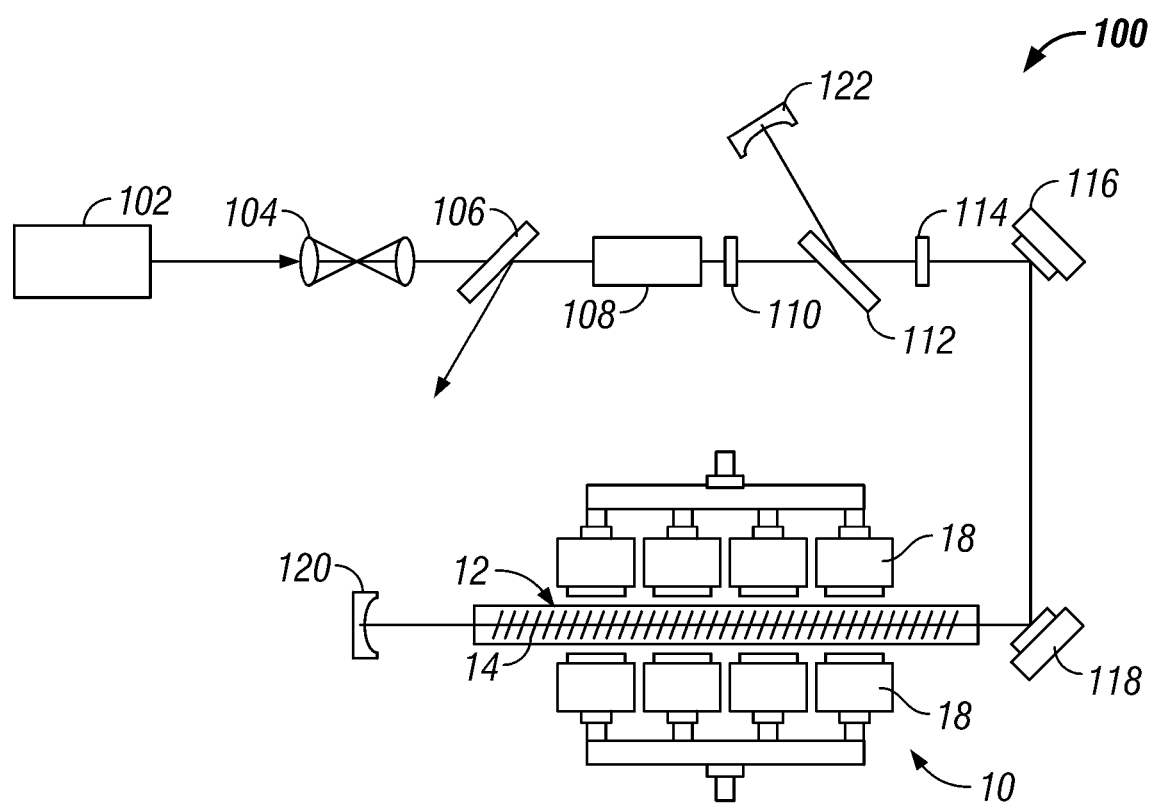
FIG. 7 illustrates an example of one embodiment of a laser device in accordance with one embodiment of the current invention used as a four-pass amplifier.

Referring next to FIG. 7, an example how an embodiment of a laser device in accordance with the invention can be used in a four-pass amplifier. Here, the beam emerges from an oscillator 102 producing a pulsed output. The beam passes through an expanding telescope 104 to adjust the beam size to approximate that of the aperture of the gain medium. The pulse then passes through a thin film polarizer 106 oriented to pass P-polarization. The pulse then passes through a Faraday Rotator 108 which rotates the polarization by 45 degrees. A half-waveplate or 45 degree quartz rotator 110 cancels the rotation of the Faraday rotator 108 orienting the beam back at P-polarization for passage through the second thin-film polarizer 112. The beam then passes through a quarter-waveplate 114 oriented to provide circular polarization at the output. The beam is then directed to (e.g., via mirrors 116 and 118) and then passes through the laser chamber 12 of a laser device 10 according to an embodiment of the present invention whereby it undergoes amplification. After the first-pass of amplification, the beam strikes a mirror 120 which directs it back through the gain medium (e.g., solid state elements 14 described herein) for a second pass. The second pass through the quarter-waveplate 114 converts the circularly polarized beam to linearly polarized in the S plane (vertical). The now S-polarized beam reflects off the thin film polarizer 112 towards another mirror 122. This mirror reflects the beam back through the waveplate and amplifier combination. The beam strikes the first mirror 120 a second time and passes a fourth time through the amplifiers. Passage through the quarter-waveplate 114 this time produces a linearly-polarized beam in the P (horizontal) plane which passes through thin-film polarizer 112. The beam then encounters the half-waveplate 110 which rotates the plane of polarization by 45 degrees. Passage through the Faraday rotator in the backwards direction rotates the polarization by an additional 45 degrees in the direction produced by the waveplate 110. The Faraday rotator/waveplate combination serves to rotate the plane of polarization by 90 degrees when the beam is travelling backwards toward the oscillator. The now S-polarized beam then reflects off of thin-film polarizer 106 and is directed out of the laser system. This is one of many possible uses of an embodiment of the present invention in a multipass amplifier. Similar uses of other embodiments of the invention as a single-pass amplifier, inside a regenerative amplifier design or as the gain medium in an oscillator cavity are not intended to be precluded by this example.

Changes and modifications in the specifically described embodiments can be implemented without departing from the scope of the invention, which is intended to be limited only by the scope of the appended claims.

What is claimed is:

1. A laser device comprising:
    a laser chamber having a volume formed therein;
    a gain medium within the volume and comprising a solid-state element containing active laser ion within the volume, the solid-state element rigidly held in a fixed position within the volume;
    a fluid flowing about the solid-state element;
    a semiconductor laser diode for providing optical pump radiation into the volume of the laser chamber; and
    a laser emission from the solid state element passes through the gain medium and the fluid;
    wherein a dimension L of the solid state element is defined by:

$$L \le \sqrt{\frac{\Delta T c k_S}{q'''}}$$

where $\Delta T$ is a maximum temperature difference between a center and a surface of the solid state element, $k_s$ is a thermal conductivity of the solid state element, c is a geometric constant wherein c is a value between 4 and 8, and $q'''$ is a heat generated per unit volume within the solid state element resulting from diode-pumping.

2. The laser device of claim 1 wherein the solid state element comprises a sheet, wherein c is equal to 8.

3. The laser device of claim 1 wherein the dimension of the solid state element is sufficiently thin such that in operation at a power level of at least 100 W, a temperature difference between the center and the surface of the solid state element across the dimension is at most 100 degrees C.

4. The laser device of claim 1 wherein a dimension the solid state element is between about 10 microns and 2 mm.

5. The laser device of claim 1 wherein the gain medium produces the laser emission at an average power of at least 100 W.

6. The law device of claim 1 wherein laser chamber further comprises an inlet and an outlet, the fluid flowed through the laser chamber from the inlet to the outlet.

7. The laser device of claim 6 further comprising a heat exchanger coupled to the inlet and outlet, the fluid exiting the outlet passing through the heat exchanger and cooled then flowed through the inlet.

8. The laser device of claim 1 wherein the fluid is flowed through the laser chamber in a direction transverse to the direction of laser emission.

9. The laser device of claim 1 wherein the solid-state element comprise one of a plurality of flat sheets distributed throughout the volume, the fluid flowing in between each of the flat sheets.

10. The laser device of claim 9 wherein each of the flat sheets is oriented at an angle with respect to the direction of a laser emission and at an angle with respect to the optical pump radiation.

11. The laser device of claim 10 wherein a spacing between each of the flat sheets is such that each of the flat sheets receives substantially the same amount of optical pump radiation from the semiconductor laser diode.

12. The laser device of claim 10 wherein a spacing between each of the flat sheets is such that a portion of each flat sheet overlaps a portion of an adjacent flat sheet relative to the direction of the optical pump radiation.

13. The laser device of claim 10 wherein a spacing between each of the flat sheets is such that adjacent flat sheets do not overlap each other relative to the direction of the optical pump radiation.

14. The laser device of claim 1 wherein a refractive index of the fluid at a wavelength of the laser emission substantially matches the refractive index of the solid state element.

15. The laser device of claim 1 wherein the fluid comprises a carbon-based material.

16. The laser device of claim 1 wherein the semiconductor laser diode provides continuous optical pump radiation in order to provide a continuous laser emission for greater than 1 second.

17. The laser device of claim 1 wherein the semiconductor laser diode provides pulsed optical pump radiation in order to provide a pulsed laser emission.

18. The laser device of claim 1 wherein the solid-state element is oriented at or near Brewster's angle with respect to a path of the laser emission.

19. The laser device of claim 1 further comprising a manifold adapted to receive the fluid to be flowed through the laser chamber and including a plurality of openings coupled to a plurality of inlets to the laser chamber distributed across a dimension of the laser chamber, the manifold providing substantially uniform flow of the fluid about the solid-state element.

20. A method of lasing comprising:
    providing a laser chamber having a volume formed therein and containing a gain medium, the gain medium comprising a solid state element containing active laser ion within the volume, the solid state element rigidly held in a fixed position within the volume;
    flowing a cooling fluid through the volume and about the solid state element;
    directing optical pump radiation produced by semiconductor laser diodes through the chamber into the volume; and
    directing a laser emission produced by the solid state element through the chamber such that the laser emission passes through the solid state element and the fluid;

wherein the providing step comprises providing the laser chamber containing the gain medium, wherein a dimension L of the solid state element is defined by:

$$L \leq \sqrt{\frac{\Delta T c k_S}{q'''}}$$

where ΔT is a maximum temperature difference between a center and a surface of the solid state element $k_s$ is a thermal conductivity of the solid state element, c is a geometric constant wherein c is a value between 4 and 8, and q''' is a heat generated per unit volume within the solid state element.

21. The method of claim 20 further comprising:
cooling a portion of the cooling fluid flowing out of the chamber and flowing the portion back into the laser chamber.

22. The method of claim 20 further comprising:
providing the optical pump radiation sufficient to operate the laser device at a power level of at least 100 W, wherein a temperature difference between the center and the surface of the solid state element across the dimension across the solid state element is at most 100 degrees C.

23. The method of claim 20 wherein the directing step comprises:
directing pulsed optical pump radiation produced by semiconductor laser diodes through the chamber into the volume.

24. The method of claim 20 wherein the directing step comprises:
directing continuous optical pump radiation produced by semiconductor laser diodes through the chamber into the volume.

25. A laser device comprising:
means for flowing a cooling fluid through a volume formed in a laser chamber and about a solid state element, the laser chamber containing a gain medium, the gain medium comprising the solid state element containing active laser ion within the volume, the solid state element rigidly held in a fixed position within the volume, wherein a dimension L of the solid state element is defined by:

$$L \leq \sqrt{\frac{\Delta T c k_S}{q'''}}$$

where ΔT is a maximum temperature difference between a center and a surface of the solid state element $k_s$ is a thermal conductivity of the solid state element, c is a geometric constant wherein c is a value between 4 and 8, and q''' is a heat generated per unit volume within the solid state element;
means for directing optical pump radiation produced by semiconductor laser diodes through the chamber into the volume; and
means for directing a laser emission produced by the solid state element through the chamber such that the laser emission passes through the solid state element and the fluid.

* * * * *